United States Patent [19]
Graham et al.

[11] 3,979,343
[45] Sept. 7, 1976

[54] SURFACE COATING COMPOSITIONS CONTAINING PIGMENT COATED WITH A POLYMERIC ORGANIC POLYOL

[75] Inventors: Thomas Graham, Clitheroe; Michael James Yates Foley, clayton-Le-Dale, near Blackburn; David Reid, Blackburn, all of England

[73] Assignee: Reed International Limited, London, England

[22] Filed: Sept. 5, 1973

[21] Appl. No.: 394,493

[30] Foreign Application Priority Data
Sept. 22, 1972 United Kingdom............... 44052/72

[52] U.S. Cl................................. 260/16; 260/22 R
[51] Int. Cl.²...................... C09D 3/14; C09D 3/20; C09D 3/18
[58] Field of Search........................... 260/16, 22 R

[56] References Cited
UNITED STATES PATENTS

| | | | |
|---|---|---|---|
| 2,593,976 | 4/1952 | Burrell et al........................ | 260/16 |
| 3,197,424 | 7/1965 | Larson................................ | 260/16 |
| 3,370,024 | 2/1968 | Grasko et al. ..................... | 260/3.5 |
| 3,393,165 | 7/1968 | Evans et al. ....................... | 260/22 |
| 3,551,367 | 12/1970 | Gasper et al....................... | 260/20 |

*Primary Examiner*—Lester L. Lee
*Attorney, Agent, or Firm*—Bacon & Thomas

[57] ABSTRACT

The conjoint use of (a) a pigment treated with a hydrophilic agent and (b) a binder composition based on a component having a relatively high hydroxyl value in an organic solvent based coating composition.

13 Claims, No Drawings

SURFACE COATING COMPOSITIONS CONTAINING PIGMENT COATED WITH A POLYMERIC ORGANIC POLYOL

This invention is concerned with pigmented surface coating compositions.

Pigments are generally included in surface coating compositions to impart various properties to a surface coating formed after drying a film of a composition that has been applied to a chosen substrate whilst binders are included in such compositions to impart various properties to both the dried film and the composition itself. Pigments thus confer, inter alia, colour, opacity and strength upon a dried film whereas the binder serves, inter alia, to maintain the pigment in a dispersed condition in the composition both before and after application to the chosen substrate so that, ultimately, a homogeneous film may be obtained. The binder also serves to ensure that the coating composition has a viscosity such that it can easily be applied to the chosen substrate and that the composition so applied will firmly adhere thereto upon drying.

The character of both the pigment and binder are therefore important since they will influence the various properties discussed above and, if an applicator e.g. a brush, roller etc, is used to apply the composition to the substrate, their character will also affect the ease of clean-up of the applicator used.

Surface coating compositions, and in particular pigmented compositions for decorative purposes, fall into two principal classes, viz those based on volatile substantially water-immiscible, organic solvents and those based on water. An important property of water-based compositions is that any applicator used to apply the composition to a substrate may be readily cleaned after use with water or with a dilute aqueous solution of detergent. However, surface coatings obtained from water-based compositions generally have low gloss.

Although the use of volatile, water-immiscible, organic solvents in solvent-based compositions may be disadvantageous from the point of view of difficulty of cleaning an applicator used, nevertheless the surface coatings obtained from such compositions have many important qualities. In particular, carefully formulated compositions based on volatile, water-immiscible organic solvents enable one to obtain surface coatings of high gloss and this is still a highly desirable property in the decorative field.

The present invention has for an object the production of pigmented, organic solvent based coating compositions possessing conventional properties associated with such compositions and also possessing the advantage that applicators such as brushes, which are used to apply these compositions to surfaces may be readily cleaned in dilute aqueous solutions of synthetic detergent.

We have now found that this can be achieved by careful selection of the components used in the surface coating composition. In particular the aforesaid object may be obtained by the conjoint use in such a system of (a) a pigment treated with a hydrophilic agent and (b) a binder composition based on a component having a relatively high hydroxyl value described in more detail below.

The component having a relatively high hydroxyl value may be such an oil-modified alkyd resin or such a polymerised fatty acid ester. The binder composition preferably also includes a conventional alkyd resin.

The binder composition together with pigment treated with a hydrophilic agent is formulated into a surface coating composition based on a water-immiscible, volatile, organic solvent. The composition so obtained possesses properties such that any applicator used in the application of the composition to a substrate may be readily cleaned in aqueous media. According to the formulation the pigmented composition may yield coatings of high or low gloss, such desiderata being obtained by conventional formulation means.

The hydrophilic agent used in the treatment of the pigment is either a polymeric organic polyol or polyvinyl pyrrolidone.

The polymeric polyol may be a naturally occurring material such as a cellulose or starch or a synthetic material such as a polyalkylene ether glycol e.g. polyethylene glycol or polypropylene glycol or a partially or completely hydrolysed polyvinyl acetate. Derivatives of the naturally occurring polyols may also be used such as cellulose ethers or starch ethers of any desired degree of substitution. Preferred derivatives of cellulose include hydroxyethyl cellulose and base salts of carboxy methyl cellulose such as sodium carboxymethyl cellulose.

Treatment of the pigment may be effected at any convenient time prior to formulation in the surface coating composition although for operational efficiency it may be preferred to effect such treatment during the manufacture of the pigment. The pigment may be treated with an aqueous solution of the hydrophilic agent in which case a drying step and a milling operation may be necessary, the latter operation being employed to break up any aggregates of treated pigment that may be formed in the drying. In general, treatment with up to 5% by weight based on the weight of the pigment of the hydrophilic agent will confer the desired properties on the pigment and treatment with small amounts such as 0.25 to 2% e.g. about 1% by weight of the hydrophilic agent is preferred.

We have also found that the desirable properties of pigments treated in the manner described above may be enhanced by the additional treatment of the pigment with a non-polymeric polyol e.g. a diol, triol or tetrol such as ethylene glycol, propylene glycol, glycerol or pentaerythritol. It is believed that the polar properties of the non-polymeric polyol advantageously affect the clean-up of the applicator in aqueous media.

The pigment may be organic or inorganic. In particular we have been able to treat titanium dioxide by the method described above so as to render it suitable for formulation in a water-immiscible, organic solvent based coating composition. Since all pigments are polar to some extent all of the hydrophilic agents proposed above will function in conjunction with any pigment although in the case of any given pigment the optimum effect conferred by the surface treatment will depend on the quantity and character of the chosen hydrophilic agent.

It is not necessary that all of the pigment should have been treated with the hydrophilic agent. Even where the composition only contains one pigment, e.g. titanium dioxide, not all of this is necessary treated If the hydrophilic agent is soluble in a solvent other than water some advantages may accrue from the treatment of the pigment with a solution of the hydrophilic agent in a non-aqueous solvent. Thus it may be advantageous to treat the pigment with the hydrophilic agent in situ after the former has been formulated into a surface coating composition. For example, in the case of polyvinylpyrrolidone, a solution may readily be formed in a lower alkanol such as n-propanol or n-butanol and such a solution may be used in the treatment of pigment either before or after dispersion thereof.

The pigment so treated is then dispersed with a binder composition which, as stated above, may comprise an oil-modified alkyd resin having a relatively high hydroxyl value. The hydroxyl value should be at least 90, preferably at least 150, advantageously at least 170 and not more than 270.

Hydroxyl value is the number of milligrams of potassium hydroxide required to neutralise the quantity of acetic anhydride required to acetylate one gram of resin.

In order to ensure good cleaning of the applicator in aqueous media of coating compositions based on an oil-modified alkyd resin it is preferred that such a resin should have a hydroxyl value of from 150 to 230. To further improve the aforesaid dispersability it is desirable that such a resin should have a short chain length and therefore a relatively low molecular weight. Advantageous results have been found to accrue when resins having an average chain length of less than about 200 A (as measured by gel permeation chromatography) have been used and it is preferred to employ resins having an average chain length of from 50 to 90 A.

The oil-modified alkyd resin having a relatively high hydroxyl value may be prepared, for example, by alcoholysing a drying or semi-drying oil such as, for example, linseed oil, soya bean oil, dehydrated castor oil, or tobacco seed oil with a greater than equimolar amount of a polyhydric alcohol followed by reaction with a polycarboxylic acid component e.g. phthalic anhydride, isophthalic acid, terephthalic acid, maleic anhydride, fumaric acid etc. The polyhydric alcohol is preferably a tri- or higher-hydric polyol such as glycerol, pentaerythritol or dipentaerythritol, if desired in the presence of a dihydric alcohol e.g. ethylene glycol or diethylene glycol. The reaction components are generally heated e.g. to temperatures in excess of 200°C and the reaction continued until a product is obtained having a relatively low (e.g. less than 20) acid value. Acid value is the number of milligrams of potassium hydroxide required to neutralise one gram of resin.

As stated above, as an alternative to the oil-modified alkyd resin having a relatively high hydroxyl value, the binder composition may comprise a polymerised fatty acid ester having a relatively high hydroxyl value. The polymerised fatty acid ester is preferably obtained by polymerising, to a limited degree, an unsaturated fat acid to yield a dimerised, trimerised or tetramerised fat acid or a mixture thereof. The partially polymerised product, which may contain some unreacted, unsaturated fat acid, is reacted with a polyhydric alcohol to form a polymerised fatty acid ester having a relatively low acid value and a relatively high hydroxyl value.

The unsaturated fat acid may have from 8 to 24 carbon atoms, preferably from 12 to 20 carbon atoms. We prefer to use linoleic acid or related fat acids. The polyhydric alcohol may be a diol, triol or tetrol such as ethylene glycol, propylene glycol, glycerol or pentaerythritol. Reaction with a stoichiometric excess of polyhydric alcohol ensures that a polymerised fatty acid having a relatively low (e.g. below 15) acid value and a relatively high (i.e. from 70–220, e.g. 80–150) hydroxyl value is obtained.

The binder composition including the component having a relatively high hydroxyl value preferably also contains a conventional alkyd resin. Such a binder composition may thus comprise from 5 to 95% by weight of the component having a relatively high hydroxyl value and from 95 to 5% by weight of the conventional alkyd resin. Preferably such a binder composition will comprise from 20 to 80% by weight of each component.

The conventional alkyd resin may be a medium or long oil length alkyd having a hydroxyl value below 60, preferably below 50.

Oil length is the oil content expressed as a percentage by weight of the total resin. A long oil length resin is one in which the oil length is 60% or more; a medium oil length resin is one in which the oil length is from 45 to 60%.

If desired the binder composition may also include a solvent soluble polyurethane resin. Such a resin is believed to contribute substantially to the hardness and film-forming properties of paints formulated from the compositions on surfaces.

A preferred binder composition according to the invention comprises (i) from 10 to 40% by weight of a conventional alkyd resin (ii) up to 40%, preferably from 10 to 40%, by weight of a solvent-soluble polyurethane resin and (iii) from 80 to 20% by weight of the component having a relatively high hydroxyl value.

Conventional alkyd resin (i) preferably has a low acid value (i.e. ~ 10) and may be prepared from drying or semi-drying oils, polyhydric alcohols and polycarboxylic acid components by analogy with the high hydroxyl value oil-modified alkyd resin.

The polyurethane resin (ii) may be any of the usual types of such resin employed in the paint industry. It may thus be formed by reaction of an organic polyisocyanate (e.g. tolylene diisocyanate) and drying oil fatty acids, with a di- or higher-hydric polyol.

Advantageously the average hydroxyl value of the total binder composition is from 65 to 130.

A surface coating composition based upon pigment treated with a polymeric organic polyol in the manner described above and the binder composition according to the invention may be formulated with a volatile, water-immiscible organic solvent in any convenient way. Thus, for example, a mill-base may be formed by dispersing the treated pigment in part of the binder composition. Suitable methods for effecting pigment dispersion include passing the mill-base over a triperoll mill, ball-milling or sand-grinding. The remainder of the binder may be added after forming the mill-base.

The water-immiscible organic solvent may be, for example white spirit and may, if desired, be in association with small amounts of a polar organic solvent to control the viscosity and solids level of the finished composition. Suitable polar solvents include ethanol, iso-propanol, n-butanol, n-hexanol, cyclohexanol, n-octanol, methyl iso-butyl carbinol, ethoxyethanol, butoxyethanol, diethylene glycol monoethyl ether and diethylene glycol monobutyl ether. Large amounts of the polar solvent tend to cause a diminution in the gloss characteristics of coatings obtained by application of the composition to the substrate. This precludes the use of such polar organic solvents as the basis of the coating composition when coatings possessing high gloss characteristics are desired.

Any of the usual formulatory components may be added such as for example driers, surface-active agents, anti-skin agents and plasticisers to produce paints suitable for particular applications. To enhance cleaning of the applicator in aqueous media there may be added small amounts of non-ionic surface active agents e.g. polyethylene oxide derivatives and/or emulsion stabilisers, e.g. methyl cellulose or casein.

After a coating composition formulated in the manner described above has been applied to the desired substrate any applicator used therefor, e.g. brush or roller, may be readily cleaned by use of a dilute aqueous solution of washing-up detergent.

If desired, the composition according to the invention may contain a mixture of two or more pigments. These mixtures may be treated in whole or in part with polymeric polyols according to the invention to achieve the desired properties. Likewise, this composition according to the invention may contain one or more fillers, one or more of which may have been treated analogously to the pigments(s). Additionally resin components (a) and (b) of the binder composition may be wholly or partially replaced by a thixotropic resin in order to render the final paint thixotropic. If desired thixotropy may be conferred upon the surface coating composition by rendering component (c) of the binder composition thixotropic.

In order that the invention may be well understood the following Examples are given by way of illustration only:

EXAMPLE 1 A 5 grams of sodium carboxymethyl cellulose were dissolved in 350 grams of water with stirring and a trace of ammonia solution was added to assist solubility.

1,000 grams of rutile titanium dioxide were added to the solution and stirring was continued as a thick paste formed. The paste was passed over a roll mill until a smooth uniform product resulted. The product was spread as a thin layer then dried in an oven at 80° – 100°C and then milled to break up any aggregates that may have formed until a dry powder was obtained. The powder is a form of titanium dioxide that may be formulated into a solvent-based paint.

EXAMPLE 1 B

An alkyd resin having a hydroxyl value of at least 170 was prepared by reacting linseed oil fatty acids (9 moles), glycerol (14 moles) and phthalic anhydride (7 moles) at 235°C until the acid value of the resin fell to below 20. The resin was diluted with white spirit when cool and the product obtained had the following characteristics:

OH value = 230
Viscosity = 21 poise at 65% N.V.*
Oil length = 54%
*N.V. = non-volatiles.

EXAMPLE 1 C

The treated titanium dioxide and the high hydroxyl value alkyd resin were used in the following paint formulation in which parts referred to are parts by weight:

| | |
|---|---|
| Treated titanium dioxide | 100 parts |

| | |
|---|---|
| Bentone paste | 4 parts |
| Alkyd resin (OH value 230, 50% non-volatiles) | 60 parts |
| Polyurethane resin (50% non-volatiles) | 60 parts |
| Long oil length alkyd resin (75% non-volatiles) | 80 parts |
| Cobalt drier (1% Co) | 12 parts |
| Lead drier (5% Pb) | 10 parts |
| White Spirit | 5 parts |

The formulation was ball-milled for 12 hours to yield a white spirit based paint having satisfactory properties of application, drying time and gloss for normal decorative applications. Additionally, after application of the paint to a surface using a brush it was found that the brush could be readily cleaned using the following procedure:

Excess paint is wiped from the bristles of the brush and especially from any wood or metal parts thereof. Liquid household washing up detergent is placed in a jar or similar container and diluted with water. The brush is worked vigorously for some time until clean and if necessary the process is repeated with a fresh solution of detergent.

200 mls of a solution containing three parts of detergent to 100 parts of water in a jar is sufficient to clean a small brush. For larger brushes the volume of solution should be increased proportionately.

An alternative to the above method is to use neat liquid detergent on the bristles of the brush instead of using an aqueous solution. If this is worked in vigorously and the whole washed off in warm water, good results are obtained.

EXAMPLE 2

Proceeding in a manner analogous to that described in Example 1A a solution of 10 grams of hydroxyethyl cellulose in 400 grams of water was prepared. 1,000 grams of rutile titanium dioxide were added to the solution and further processing of the pigment and its incorporation into a paint was effected as in Example 1A and 1C respectively. A paint having similar properties to the product of Example 1C was obtained.

EXAMPLE 3

A fatty acid modified polyester having a hydroxy value of 90 and an acid value below 5 was prepared by reacting dimerised acid (2 moles), linseed oil fatty acids (+ moles) and pentaerythritol (3 moles). The product was diluted with white spirit and incorporated into the formulation described in Example 1C in place of the alkyd resin having a hydroxyl value of 230. A paint possessing similar properties to that of the product of Example 1C was obtained.

EXAMPLE 4

A 25% solution of polyvinylpyrrolidone in n-butanol was prepared. The solution so obtained is added to the mill base after dispersion of the pigment in the following paint formulation in which parts referred to are parts by weight:

| | | |
|---|---|---|
| Titanium dioxide | 75 | parts |
| Long oil length alkyd resin (75% non-volatiles) | 86.5 | parts |
| Polyurethane modified alkyd resin (60% non-volatiles) | 31 | parts |

-continued

| | | |
|---|---|---|
| Alkyd resin (OH value 230, 50% non-volatiles) | 31 | parts |
| Polyvinylpyrrolidone (25% in n-butanol) | 3 | parts |
| Calcium drier (4%) | 4.7 | parts |
| Co/Pb drier (2% Co/14% Pb) | 4.1 | parts |
| White spirit | 6 | parts |

The formulation was dispersed in the usual manner. A paint having similar properties to the product of Example 1C was obtained.

We claim:

1. A surface coating composition which comprises (a) a pigment coated with up to 5% by weight based on the weight of the pigment of a hydrophilic agent which is a polymeric organic polyol, (b) a binder composition comprising from 5% to 95% by weight of either an oil-modified alkyd resin having a hydroxyl value of from 90 to 270 or a polymerised fatty acid ester having a hydroxyl value of from 70 to 220 and from 95% to 5% by weight of an alkyd resin having a hydroxyl value below 60, and (c) a volatile substantially water-immiscible organic solvent, the proportions of the components (a), (b) and (c) being such that an applicator used to apply said coating composition may be readily cleaned in a dilute aqueous detergent solution.

2. A composition as claimed in claim 1 wherein the polymeric polyol is cellulose, starch or an ether of cellulose or starch.

3. A composition as claimed in claim 2 wherein the hydrophilic agent is hydroxyethyl cellulose or a base salt of carboxy methyl cellulose.

4. A composition as claimed in claim 1 wherein the polymeric polyol is a polyalkylene ether glycol.

5. A composition as claimed in claim 1 wherein the pigment comprises titanium dioxide.

6. A composition as claimed in claim 1 wherein the oil-modified alkyd resin has a hydroxyl value of at least 150.

7. A composition as claimed in claim 1 wherein the polymerised fatty acid ester is a di-, tri- or tetramer (or mixture thereof) of unsaturated fat acids having from 8 to 24 carbon atoms reacted with a molar excess of a polyhydric alcohol.

8. A composition as claimed in claim 1 wherein the binder composition includes a polyurethane resin soluble in said organic solvent.

9. A composition as claimed in claim 1 wherein the pigment is also treated with a non-polymeric polyol.

10. A composition as claimed in claim 1 wherein the volatile, substantially water-immiscible organic solvent is white spirit.

11. A surface coating composition which comprises (a) a pigment coated with up to 5% by weight based on the weight of the pigment of a polymeric organic polyol, (b) as a binder, from 5% to 95% by weight of an oil-modified alkyd resin having a hydroxyl value of from 150 to 270 and from 95% to 5% by weight of an alkyd resin having a hydroxyl value below 60, and (c) a volatile, substantially water-immiscible organic solvent, the proportions of the components (a), (b) and (c) being such that an applicator used to apply said coating composition may be readily cleaned in a dilute aqueous detergent solution.

12. A composition as claimed in claim 11 including a binder which comprises (i) from 10 to 40% by weight of a medium-long or long oil length alkyd resin having a hydroxyl value below 60, (ii) from 10 to 40% by weight of a polyurethane resin soluble in said organic solvent and (iii) from 80 to 20% by weight of said oil-modified alkyd resin.

13. A surface coating composition which comprises (a) titanium dioxide coated with up to 5% by weight based on the weight of the pigment of sodium carboxymethyl cellulose, (b) as a binder, from 5% to 95% by weight of an oil-modified alkyd resin having a hydroxyl value of 230 which is the product of the reaction at 235°C. until the acid value of the resin falls to below 20 of linseed oil fatty acids, glycerol and phthalic anhydride in the proportions of 9, 14 and 7 moles, respectively, and from 95% to 5% by weight of a long oil length alkyd resin having a hydroxyl value below 60 and (c) white spirit, the proportions of the components (a), (b) and (c) being such that an applicator used to apply said coating composition may be readily cleaned in a dilute aqueous detergent solution.

* * * * *